United States Patent Office 3,011,842
Patented Dec. 5, 1961

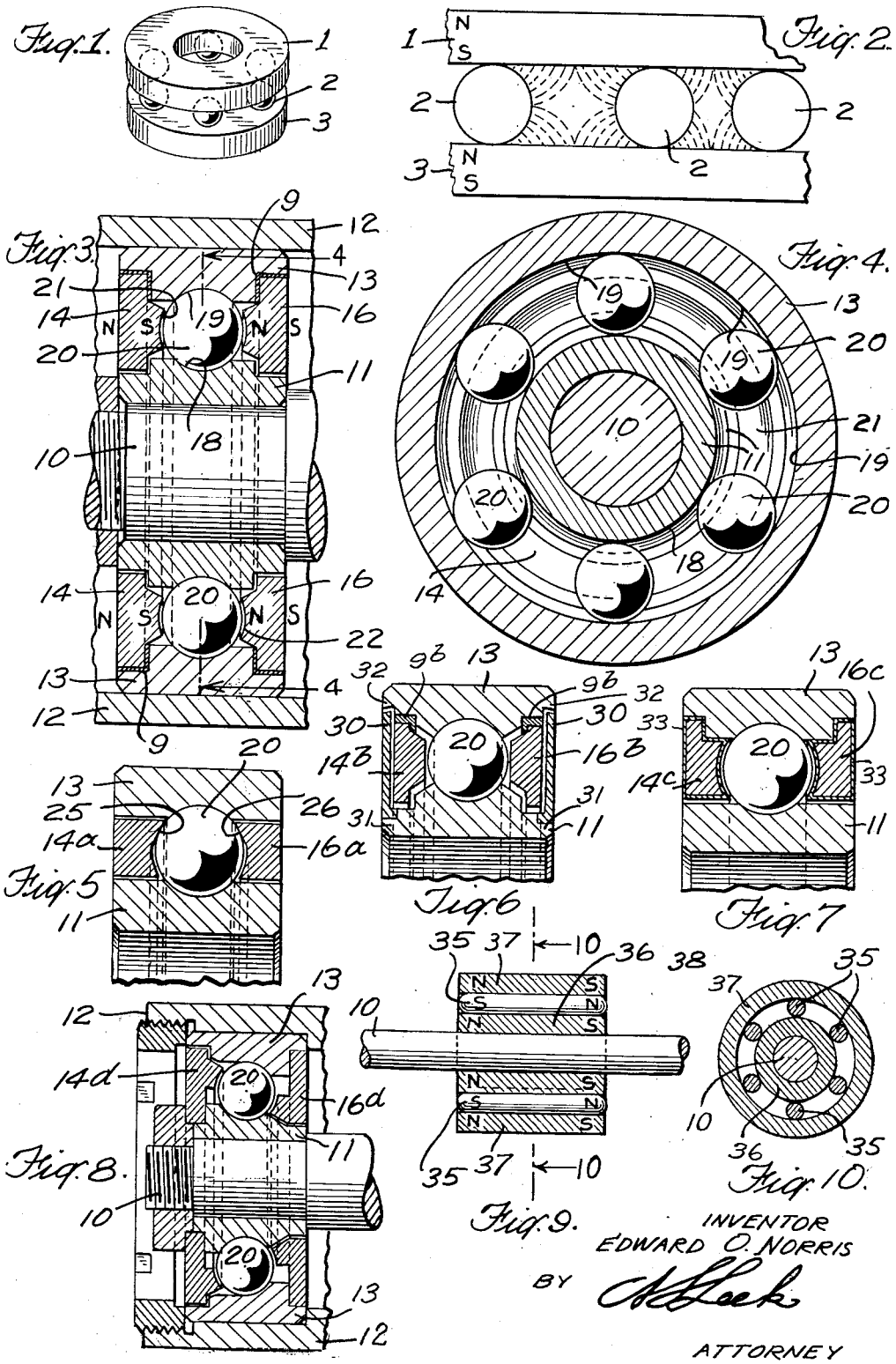

3,011,842
ANTIFRICTION BEARING
Edward O. Norris, Ledgemoor Lane, Westport, Conn.
Filed Nov. 5, 1958, Ser. No. 772,041
11 Claims. (Cl. 308—188)

This invention relates to anti-friction bearings and more particularly to bearings having rolling elements.

A principal object of this invention is to provide a bearing of the above type having no rubbing or sliding surfaces.

Another object is to provide an anti-friction bearing in which the rolling elements are maintained in uniformly spaced relationship without the use of the customary separating ring.

A further object is to provide a bearing of the above type which requires no lubrication.

A still further object is to provide a bearing of the above type which will operate at very high speeds over long periods of time without any significant temperature rise.

Another object is to provide a bearing of the above type having very low break out and running torque drag.

Another object is to provide an anti-friction type bearing which will operate silently at high speeds without evidence of separator vibration or chatter.

A further object is to provide an anti-friction type bearing embodying spaced rolling elements, which is resistant to breakdown under adverse operating conditions.

Another object is to provide an anti-friction type bearing which may be operated over extended periods of time under high temperature conditions.

A further object is to provide an anti-friction bearing made of ferromagnetic material which is resistant to extraneous magnetic fields.

Another object is to provide a shielded or sealed anti-friction type bearing whose seals or shields are maintained in operative association by magnetic means.

A further object is to provide an anti-friction type bearing which is maintained in operative assembly by magnetic means.

A still further object is to provide an anti-friction type bearing which may be readily disassembled for cleaning and inspection.

In accordance with the present invention, the rolling elements, such as balls or rollers, are subjected to a uniform magnetic field.

It has been found that such a magnetic field serves to space the rolling elements uniformly around the bearing and to maintain them in uniformly spaced relationship while the bearing is being operated. Since this spacing is accomplished without the use of spacing rings or other elements which contact or rub on the surfaces of the rolling elements, the friction induced by such a spacing ring or the like is eliminated and the necessity for lubrication is also eliminated. All contacting surfaces are rolling surfaces and it has been found that the magnetic field introduces no appreciabled rag. Hence the bearing is substantially frictionless in operation and due to the absence of friction no heat is developed even during long periods of use.

These and other objects of the invention will become apparent from the following description when taken in connection with the drawings.

In the drawings:
FIG. 1 is a perspective view of a thrust bearing embodied in the present invention;
FIG. 2 is a diagrammatic view illustrating the operation of the invention;
FIG. 3 is a broken sectional view illustrating the invention as applied to a radial bearing and showing magnetic rings associated with the outer race;
FIG. 4 is a partial section taken on the line 4—4 of FIG. 3;
FIG. 5 is a fragmentary section of a radial bearing having floating magnetic rings;
FIG. 6 is a sectional view similar to FIG. 3 showing magnetizable rings associated with the bearing to form a supplemental magnetic field path, a labyrinth seal and an energizing ball reorienting member;
FIG. 7 is a section similar to FIG. 6 showing an embodiment wherein the ceramagnetic rings are provided with a sealing and reinforcing coating on all surfaces;
FIG. 8 is a broken sectional view of a bearing of the combined radial and thrust type embodying the present invention;
FIG. 9 is a sectional view illustrating the invention applied to a needle type bearing; and
FIG. 10 is a transverse section taken on the line 10—10 of FIG. 9.

Referring to the drawing more in detail, FIG. 1 shows rings 1 and 3 which are composed of ceramic barium ferrite materials, for example such as that sold commercially under the name of Indox 1. These rings are permanently magnetized in an axial direction so that the whole upper circular face of each ring has a uniform north polarity and the whole lower circular face of each ring has a uniform south polarity. A plurality of standard steel balls 2 of the type commonly used in ball bearings have been placed on the upper (north pole) face of ring 3 and the lower (south pole) face of ring 1 has been placed over ring 3 in contact with the balls, the magnetic field between the two rings causing the balls to assume a uniformly spaced ring around the magnetic center of the circular field. This uniform spacing will be attained regardless of the initial position in which the balls are placed. It will be found that when ring 1 is rotated with respect to ring 3 in the manner of a ball thrust bearing the balls will remain evenly spaced.

The uniformity of this ball spacing and the distances of each ball from the center of the ring will be found to be of a very high order and the two ceramic rings will be positioned concentrically and will evidence strong resistance to any effort to move them out of concentricity.

Also, if these magnetic rings are spaced apart slightly so that the balls are in contact with only one magnetic surface they will be found to strongly resist any effort to move them out of their uniformly spaced positions and will immediately return to those positions when the disturbing force is removed. If any one of these balls is pushed in a tangential direction, the remaining ring of balls will be found to rotate in the same direction as though there were springs between them.

The magnetic effect is illustrated in FIG. 2. It will be noted that these balls are not shown evenly spaced. Lines of force are shown being distorted by the higher magnetic permeability of the ferromagnetic balls.

It will be noted that the balls which are more widely separated are subjected to unbalanced forces. It is considered that the tendency of these lines of force to reach a condition of minimum distortion will draw the two widely spaced balls together until there are an equal number or density of lines of force working on each side of each ball.

When a uniform magnetic field is distorted in any way the field tends to return to a uniform state in which the lines of force take the shortest possible path between the two magnetic poles. In the above example this occurs when all of the balls are uniformly spaced. Consequently the balls if free to move are shifted magnetically under the influence of the magnetic field until they assume a uniform spacing wherein the lines of force between the north and south poles of the upper and lower races have the shortest path and the magnetic reluctance of the system is lowest.

In the thrust bearing of FIG. 1 the lines of force extend in a direction normal to the axis of rotation of the balls.

FIGS. 3 to 8 illustrate embodiments of the invention applied to a radial ball bearing wherein the magnetic lines of force extend parallel to the axis of rotation of the balls.

FIG. 3 shows a standard type of commercial ball bearing which has been modified so that two specially contoured ceramic barium ferrite ring magnets have been functionally substituted for the standard ball separating ring.

More specifically FIG. 3 shows a shaft 10 carrying an inner ball race 11 and a housing 12 in which an outer ball race 13 is secured. Rings 14 and 16 of magnetic material of the type above described are in contact with and spaced from the outer race 13 by non-magnetic spacer rings 9 and may be held in position magnetically and carried by the outer, customarily stationary, race 13. The races 11 and 13 are provided with the usual channels 18 and 19 respectively in which the balls 20 are confined. The magnetic ring 14 is disposed adjacent the balls 20 and is provided with recessed surface 21 conforming to the curvature of the balls for the purpose of reducing the air gap. The ring 16 is provided with a similar recessed surface 22.

The rings 14 and 16 are permanently magnetized in an axial direction so that their inner surfaces facing the balls have opposite polarities whereby the magnetic lines of force extend between these rings through the balls 20 and serve to space the balls in the manner above described. The rings 14 and 16 are also effective as seals to prevent contamination of the bearing by dust or dirt. These rings are both shown as associated with the outer, stationary, race. They may, however, be associated with the inner race and rotate with it.

It has been found that these bearings will operate without lubrication at high speeds, that is, 15,000 to 20,000 r.p.m., eight to ten hours continuous operation, without evidence of a discernible temperature rise, without vibration or chatter, and with very low torque drag.

When such a test operation was stopped occasionally and a ring magnet lifted to expose the balls, they were always found to be uniformly spaced. However, when both ring magnets were removed and the bearing was rotated the balls were found to quickly come together in tight little groups of two or three balls which rubbed on each other.

When the ring magnets were replaced and the bearing was then rotated for ten or fifteen seconds, the balls were always found to have been restored to a condition of uniform spacing.

Operation of these magnetically spaced bearings in strong extraneous magnetic fields indicated no harmful effect to the operation of the bearings.

Vibration appears to have no harmful effect on the operation of these bearings and reduces their starting or break out drag to substantially zero.

FIG. 5 shows a modification of this invention. In this figure the construction is similar to that shown in FIGS. 3 and 4 except that the permanently magnetized rings 14a and 16a of FIG. 5 are floating instead of being associated with the ball race. These rings 14a and 16a are provided with coned circular surfaces 25 and 26 which rest upon the balls 20 radially beyond their axes or rotation in such a way that the rings 14a and 16a roll on and rotate with the balls 20, magnetic attraction holding them in contact with the balls.

FIG. 6 shows a construction generally similar to FIG. 3 except that the ring magnets 14b and 16b are separated from the races with wider spaces than in FIG. 3. The space between these ring magnets and the outer race 13 is maintained by spacing rings 9b made of non-magnetic material such as brass or aluminum.

Shield rings 30 made of mild steel or other highly magnetically permeable material are located in shoulders 31 on the inner race 11 and are held in contact with these shoulders by the magnetic attraction of the rings 14b—16b. These rings 30 are spaced away from the ring magnets and the outer race.

These rings 30 serve two functions. They serve to complete the return magnetic path through the inner and outer races. This tends to concentrate those lines of force in the ball path and thereby increase the magnetic separating force acting on the balls. These rings 30, rotating with the inner race in closely spaced relationship with the back face of the normally stationary ring magnets, form a very effective labyrinth type seal.

In spite of the fact that the forces operating to keep the balls spaced in these bearings are relatively yieldable ones, these bearings are proving to be more durable under harsh operating conditions than bearings employing the standard mechanical ball separators.

Under certain conditions of bearing misalignment and high speed and/or the sudden introduction of foreign matter in the ball tracks, the forces operating to upset the uniform spacing of the balls can be momentarily very great, sufficiently great to rupture a mechanical separating ring. However, in these novel bearings, the balls will be momentarily forced together under the above circumstances and then proceed to space out and function normally, with one exception. This exception is in the radial-thrust type bearing where the balls are inserted in the bearing by laying the inner race eccentrically within the outer race and putting as many balls in the open segment thus formed between them as it will accept. The inner race is then pushed into concentric association with the outer race and the balls are spread around in the ball grooves by sliding them with a pointed rod. This type of bearing will, under all normal circumstances, operate satisfactorily under the influence of the magnetic spacing rings.

However, it is possible that under the extremely adverse conditions described above the balls could become momentarily bunched and at that instant the bearing would fall apart and break down. This type of failure is prevented by the construction shown in FIG. 6. In this figure shoulders 31 on the inner race 11 are ground .001 inch to .003 inch eccentric with the ball track and the mating hole in ring 30 is also bored .001 to .003 inch eccentric with the outer periphery of the ring 30. The mating surfaces of the ring 30 at shoulder 31 are finished smooth for a good bearing surface and may or may not be greased. The ring 30 has a somewhat greater clearance with a shoulder 32 on the outer race 13. These mating surfaces are rough finished and the clearance is in the order of .002 to .006 inch (correlated with the degree of the eccentricities described above).

In operation, in the event that severely abnormal conditions cause the balls to bunch, the shoulders 32 of outer race 13 will come in contact with the peripheries of rings 30, and rings 30 will momentarily rotate on the shoulders 31 of race 11.

However, due to the fact that the grouped balls are rotating at a different speed than race 11, the pinching effect of the eccentric spacing will quickly coincide with the position of the center or trailing balls in the group and the leading balls will then momentarily be relieved of their loading and under the influence of the magnetic field will start spreading and resume their load carrying function. Frictional contact with the outer race will cause the rings 30 to rotate on shoulder 31 until the two eccentricities tend to cancel each other and there is again a clearance between rings 30 and the shoulder 32 and the bearing will resume normal function.

FIG. 7 shows a further embodiment wherein the magnetic rings 14c and 16c are mounted on the outer race 13 and are provided with a continuous surface coating 33. This coating can be an organic coating such as aluminum, bronze paint, a vinyl lacquer or an epoxy resin enamel or Teflon or an electrodeposited metal coating such as nickel or silver. These coatings serve to prevent magnetic material from chipping off of the rings and getting into the race grooves. They also serve to hold the rings together in event of their cracking due to, for instance, thermal shock.

Referring to FIG. 8 the arrangement is generally similar to that of FIGS. 3 and 6 and the corresponding parts have been given the same reference characters. In FIG. 8 the magnetic ring 14d is shown as attached to the inner ball race 11 and the magnetic ring 16d is shown as carried by the outer ball race 13. Each of these rings 14d and 16d extend in a radial direction past the axis of the rotation of the balls 20 and its inner surface is curved inwardly beyond the axis of the balls so as to provide a minimum clearance or magnetic gap and at the same time to cause the magnetic lines of force to flow in a direction parallel to the axes of rotation of the balls which in this case are not parallel to the axis of rotation of the bearing but somewhat inclined to that axis due to the combination radial and thrust forces to which the bearing is subjected.

While these magnetic rings may in some instances be made of other permanent magnetic material such as the Alnicos or a permanently magnetized elastomer material such as Ken Mag or a permanently magnetized plastic such as can be prepared by crushing and grinding up a piece of Indox I or V and incorporating this magnetic powder into a plastic structure such as Bakelite, which may be formed and cured in a strong magnetic field, I have so far found that these ceramic ferrites such as Indox I or V made by Indiana Steel Products Co., Valparaiso, Ind., to be particularly satisfactory. Ceramagnet, made by Stackpole Carbon Co., St. Marys, Pa., may also be used.

The ceramic magnetic rings appear to create a remarkably uniform magnetic field structure, they can be easily molded to suitable shapes, they are highly resistant to demagnetization due to magnetic fields, high temperatures or mechanical vibration.

The races may be made of ferromagnetic material such as standard bearing steels or magnetic bearing stainless alloys such as alloy 420 or they may be made of non-magnetic material such as stainless alloy 303 or berylium bronze or a phenolic plastic such as Bakelite.

The balls or rolling elements must be made of ferromagnetic materials such as standard ball bearing steel or 420 stainless alloy or even a magnetic ceramic material such as Stackpole Carbon Company's Ceramag, Ceromagnet or Indox.

There are indications that the ring magnets can be made thinner and superior performance results if the balls or rolling elements are permanently magnetized along their axes of rotation.

Because these balls or rolling elements are not being subjected to any rubbing action they and the races may be given a corrosion resistant coating such as electrodeposited copper, cadmium or rhodium. Or they may be plated with molybdenum which may then be sulphided.

While I have shown and stressed the use of two magnetic rings only one ring may be used in certain applications. Also in certain applications one magnetic ring may have a stronger magnetic field than the other so that the rolling elements are always held in contact with the raceways.

FIGS. 9 and 10 illustrate applications of this magnetic spacing and positioning principle to roller or needle type anti-friction bearings.

In the embodiment of FIGS. 9 and 10 the needles or rollers 35 and inner and outer races 36 and 37 respectively are of substantially the same axial length. Here the needles or rollers are polarized in the opposite direction from one or both of the races in which event the axial alignment is effected by magnetic attraction and the roller spacing by magnetic repulsion as well as the magnetic forces described above. Either the rollers and/or one or both of the races may be permanently magnetized in an axial direction.

Although certain embodiments of the invention have been shown and described it is to be understood that the invention may be adapted to various uses as will be apparent to a person skilled in the art.

What is claimed is:

1. An anti-friction bearing comprising inner and outer races, rolling elements or magnetic permeable material disposed to roll between said races, and a ring of magnetic material disposed axially on at least one side of said rolling elements, said ring having a uniformly magnetized face and being adapted to produce a uniform magnetic field extending around the entire path of movement of said rolling elements said rolling elements being adapted to progressively traverse said field in their path of rolling movement whereby they are brought into a condition of uniform spacing by the action of said magnetic field.

2. An anti-friction bearing as set forth in claim 1 in which said magnetic ring is carried by one of said races.

3. An anti-friction bearing as set forth in claim 1 in which said magnetic ring is carried by said outer race and a closure ring carried by the inner race is disposed beyond said magnetic ring and has a running clearance with said outer race, said closure ring being composed of a magnetically permeable material.

4. An anti-friction bearing as set forth in claim 3 in which a non-magnetic material is disposed between said magnetic ring and said outer race.

5. An antifriction bearing comprising a pair of races, rolling elements composed of magnetic permeable material disposed to roll between said races in a predetermined path, said rolling elements being mechanically free to assume a random spacing, and means subjecting said rolling elements to a uniform magnetic field along their entire path of movement, the lines of force of said field lying in a plane extending transversely of said path and being progessively traversed by said rolling elements as they advance through said field.

6. An antifriction bearing as set forth in claim 5 in which said rolling elements are permanently magnetized with like poles appearing on like sides of all of said elements.

7. An antifriction bearing as set forth in claim 5 in which the lines of force of said magnetic field extend in a direction parallel to the axes of rotation of said elements.

8. An antifriction bearing as set forth in claim 5 in which at least one of said races is composed of magnetic material and is magnetized in a direction to cause the magnetic lines of force to pass through said rolling elements in a direction transverse of the path of said elements.

9. An antifriction bearing as set forth in claim 5 in which at least one of said races is composed of magnetic material and is permanently magnetized in an axial direction whereby the magnetic lines of force are caused to pass through said rolling elements in a direction parallel to their axes of rotation.

10. An antifriction bearing as set forth in claim 5 in which said races are annular and said magnetic field is produced by a magnetic member disposed at one side of the path of said rolling elements and magnetized in a direction to provide an annular pole of uniform field strength in axial alignment with the path of the axes of said rolling members.

11. An antifriction bearing comprising a pair of annular races, rolling elements composed of magnetic permeable material disposed to roll between said races in an annular path, said elements being mechanically free to assume a random spacing, and an annular magnetic member having an annular pole face disposed on one side of said rolling members and in axial alignment with the areas of rotation of said members as they advance along said annular path, said annular magnetic member being magnetized in a direction to cause said annular pole face to be of uniform intensity and to produce a magnetic field of uniform intensity around the entire path of movement of said members which is progressively traversed by said rolling members as they advance along said path, said magnetic field extending at least in part through said rolling members in a direction parallel to their axes of rotation, the return path for said magnetic field to said annular magnetic members lying in only one of said races whereby any magnetic coupling between said races is eliminated.

References Cited in the file of this patent

UNITED STATES PATENTS

| | | |
|---|---|---|
| 2,381,730 | Ellis | Aug. 7, 1945 |
| 2,704,231 | Goldsmith | Mar. 15, 1955 |
| 2,764,433 | Cobb | Sept. 25, 1956 |
| 2,807,509 | Anderson | Sept. 24, 1957 |
| 2,913,289 | Stevenson | Nov. 17, 1959 |

FOREIGN PATENTS

| | | |
|---|---|---|
| 539,409 | Great Britain | Sept. 9, 1941 |
| 935,517 | Germany | Nov. 24, 1955 |